US012663807B2

(12) United States Patent
Omori

(10) Patent No.: US 12,663,807 B2
(45) Date of Patent: Jun. 23, 2026

(54) AUTONOMOUS DRIVING METHOD, WORK VEHICLE, AND AUTONOMOUS DRIVING SYSTEM

(71) Applicant: Yanmar Holdings Co., Ltd., Osaka (JP)

(72) Inventor: Yasunori Omori, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 187 days.

(21) Appl. No.: 18/281,771

(22) PCT Filed: Feb. 4, 2022

(86) PCT No.: PCT/JP2022/004469
§ 371 (c)(1),
(2) Date: Sep. 12, 2023

(87) PCT Pub. No.: WO2022/201902
PCT Pub. Date: Sep. 29, 2022

(65) Prior Publication Data
US 2024/0152158 A1     May 9, 2024

(30) Foreign Application Priority Data

Mar. 22, 2021    (JP) ................................. 2021-046860

(51) Int. Cl.
| | |
|---|---|
| *G05D 1/617* | (2024.01) |
| *A01B 69/04* | (2006.01) |
| *A01D 41/127* | (2006.01) |
| *G05D 1/223* | (2024.01) |
| *G05D 105/15* | (2024.01) |
| *G05D 107/20* | (2024.01) |

(52) U.S. Cl.
CPC ........... G05D 1/617 (2024.01); A01B 69/008 (2013.01); A01D 41/1278 (2013.01); *G05D 1/2232* (2024.01); *G05D 2105/15* (2024.01); *G05D 2107/21* (2024.01)

(58) Field of Classification Search
None
See application file for complete search history.

(56) References Cited

U.S. PATENT DOCUMENTS

2022/0185274 A1*  6/2022  Singh ........................ B60T 7/12

FOREIGN PATENT DOCUMENTS

| | | | |
|---|---|---|---|
| JP | 2019103467 A | 6/2019 | |
| JP | 2020018236 A * | 2/2020 | ........... A01B 69/008 |

* cited by examiner

*Primary Examiner* — Tamara L Weber
(74) *Attorney, Agent, or Firm* — Chris Mizumoto

(57) ABSTRACT

A combine is a work vehicle that autonomously travels on the basis of a preset travel route, and is provided with an autonomous travel allowance switch, which is an autonomous travel allowance operation member that allows autonomous travel, and a control device that functions as an autonomous travel control part that controls autonomous travel based on the travel route. The autonomous travel control part executes autonomous travel based on the travel route while the autonomous travel allowance switch is being operated (pressed).

10 Claims, 5 Drawing Sheets

1

AUTONOMOUS DRIVING METHOD, WORK VEHICLE, AND AUTONOMOUS DRIVING SYSTEM

CROSS-REFERENCE

This application is a US National Stage Application under 35 U.S.C. § 371 of International Application No. PCT/JP2022/004469 filed Feb. 4, 2022, which claims foreign priority of JP2021-046860 filed Mar. 22, 2021 and the disclosures of which are hereby incorporated by reference in their entirety

TECHNICAL FIELD

The present invention relates to an autonomous driving method for a work vehicle that autonomously travels based on a preset travel route, a work vehicle, and an autonomous driving system.

BACKGROUND ART

Conventionally, some work vehicles, such as combine harvesters and tractors, execute the autonomous travel based on a given travel route.

For example, an autonomous driving system disclosed in Patent Literature 1 is provided with a travel control part that causes a work vehicle to autonomously travel. In an embodiment of Patent Literature 1, a user operates a wireless communication terminal thereby to give an instruction to start the autonomous travel, and thereby the tractor executes the work while traveling along the straight and turn routes.

CITATION LIST

Patent Literature

Patent Literature 1: Japanese Unexamined Patent Application Publication No. 2020-092621

DISCLOSURE OF INVENTION

Problems to be Solved by the Invention

In the conventional work vehicle, however, the worker may mistakenly give an instruction to start the autonomous travel by only touching the start button, which is for giving the instruction to start the autonomous travel, or the operation key of the touch screen, thus executing the autonomous travel not intended by the worker. Further, there is a concern that, even in the case where the risk priority of the route is high, the autonomous travel is continued, decreasing the safety. Further, executing the process of checking the risk priority for each route causes a concern of reducing workability (work efficiency).

It is an object of the present invention to provide an autonomous driving method, a work vehicle, and an autonomous driving system each capable of enhancing safety and workability and suppressing autonomous travel not intended by a worker.

Means for Solving the Problems

For solving the above problem, an autonomous driving method of the present invention is an autonomous driving method of a work vehicle that executes an autonomous travel based on a preset travel route, the autonomous driving method including: an operation step that operates an autonomous travel allowance operation member that allows for the autonomous travel; a travel route creation step that creates the travel route having an allowance operation member-nonrequiring route and an allowance operation member-requiring route; and an autonomous travel control step that controls the autonomous travel which is based on the travel route, wherein the autonomous travel control step, in the allowance operation member-nonrequiring route, executes the autonomous travel regardless of the operation of the autonomous travel allowance operation member, meanwhile, in the allowance operation member-requiring route, executes the autonomous travel when the autonomous travel is allowed in response to the operation of the autonomous travel allowance operation member.

Further, for solving the above problem, a work vehicle of the present invention is a work vehicle that executes an autonomous travel based on a preset travel route, the work vehicle including: an autonomous travel allowance operation member that allows for the autonomous travel; a travel route creating part that creates the travel route having an allowance operation member-nonrequiring route and an allowance operation member-requiring route; and an autonomous travel control part that controls the autonomous travel which is based on the travel route, wherein the autonomous travel control part, in the allowance operation member-nonrequiring route, executes the autonomous travel regardless of the operation of the autonomous travel allowance operation member, meanwhile, in the allowance operation member-requiring route, executes the autonomous travel when the autonomous travel is allowed in response to the operation of the autonomous travel allowance operation member.

Further, for solving the above problem, an autonomous driving system of the present invention is an autonomous driving system provided with a work vehicle that executes an autonomous travel based on a preset travel route, the autonomous driving system including: an autonomous travel allowance operation member that allows for the autonomous travel; a travel route creating part that creates the travel route having an allowance operation member-nonrequiring route and an allowance operation member-requiring route; and an autonomous travel control part that controls the autonomous travel which is based on the travel route, wherein the autonomous travel control part, in the allowance operation member-nonrequiring route, executes the autonomous travel regardless of the operation of the autonomous travel allowance operation member, meanwhile, in the allowance operation member-requiring route, executes the autonomous travel when the autonomous travel is allowed in response to the operation of the autonomous travel allowance operation member.

Effect of the Invention

The present invention provides an autonomous driving method, a work vehicle, and an autonomous driving system each capable of enhancing safety and workability and suppressing autonomous travel not intended by a worker.

DESCRIPTION OF EMBODIMENTS

A combine harvester 1 which is one embodiment of a work vehicle of the present invention will be described with reference to FIG. 1 and the like. The combine harvester 1, by an autonomous drive or a manual operation, travels in a farm field as a work target, and executes work such as mowing so as to execute work for harvesting crops from grain culm planted in the farm field.

The combine harvester 1 is set to a travel mode of any of a manual travel mode and an autonomous travel mode. The combine harvester 1 is so configured as to execute, when the manual travel mode is being set, the manual travel in response to a worker's maneuvering of a maneuvering part 9.

Figure 4:
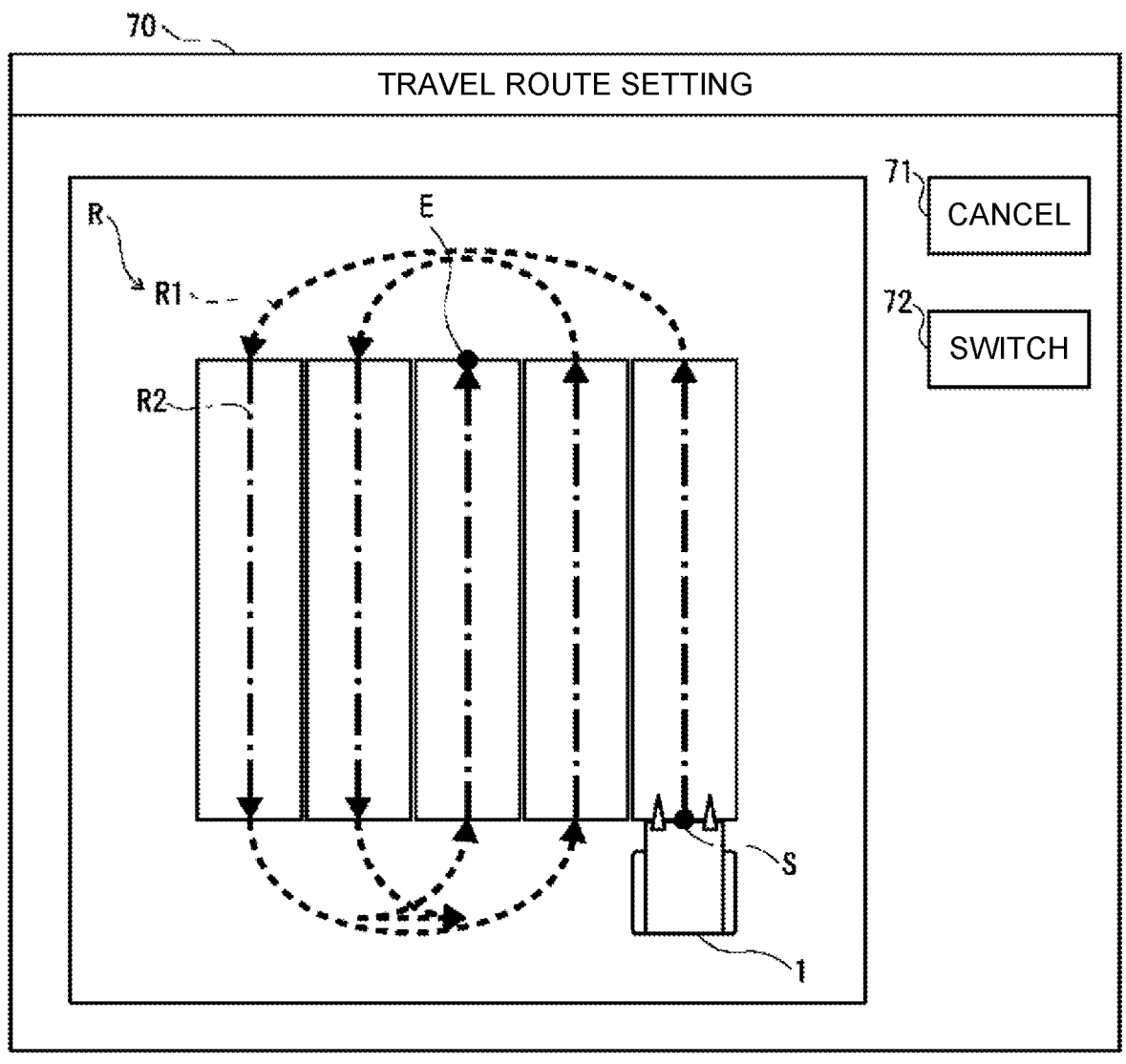
FIG. 4 is a plan view showing an example of a travel route setting screen displayed on a mobile terminal in the combine harvester according to the one embodiment of the present invention.

Meanwhile, the combine harvester 1 is so configured as to execute, in the case of the autonomous travel mode being set, an autonomous mowing travel that executes an autonomous mowing while executing an autonomous travel following a preset travel route R (see FIG. 4). For example, the combine harvester 1 executes the autonomous mowing travel of a travel pattern such as a reciprocating mowing for making reciprocating movements in plural work routes in the farm field's area having yet-to-be-mowed grain culm (hereinafter, referred to as "yet-to-be-mowed area"), or a turn mowing in which the circumferential trip of the work route along an inner periphery of the yet-to-be-mowed area is shifted to the center side and is repeated.

Figure 1:
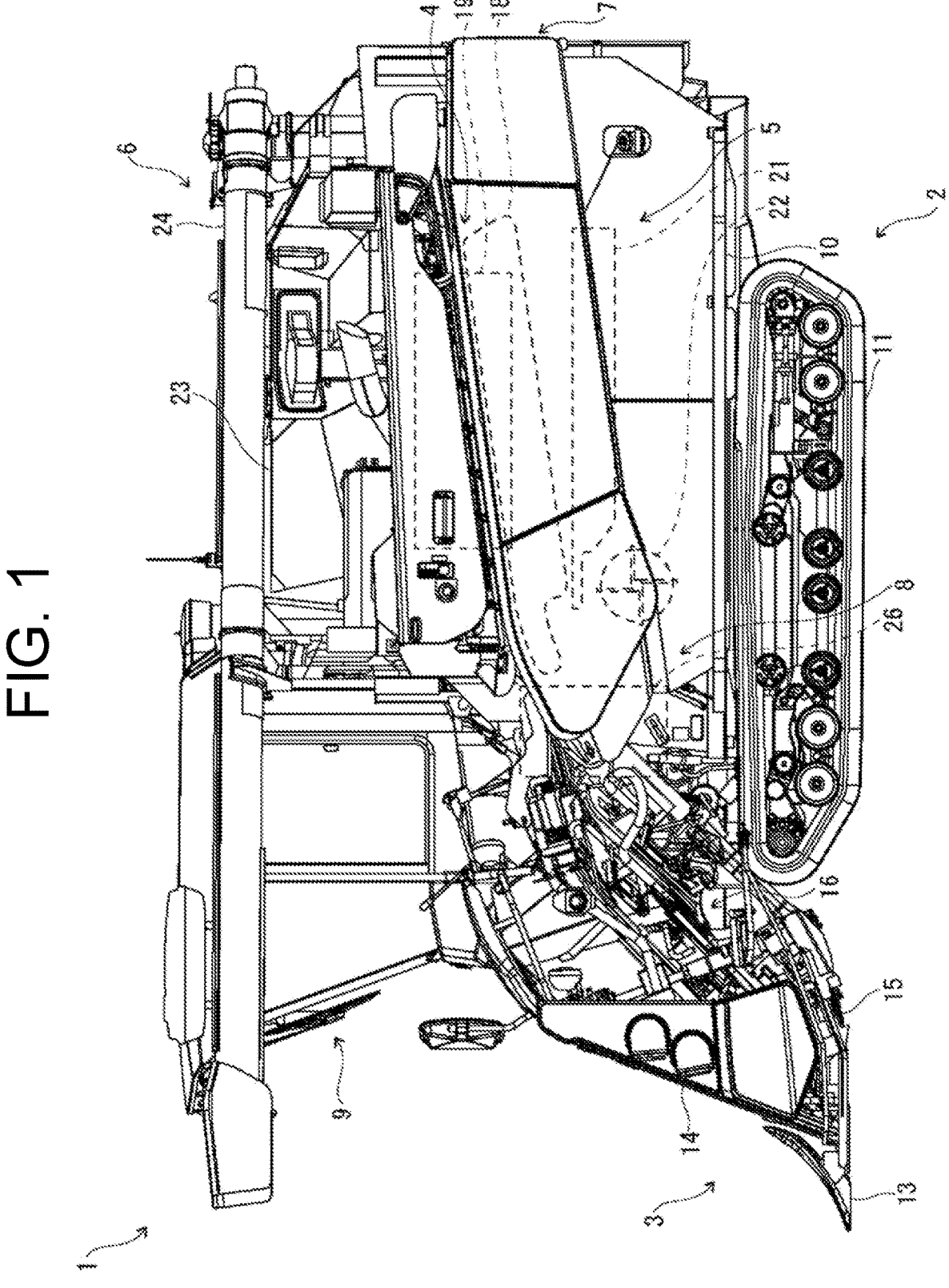
FIG. 1 is a side view of a combine harvester according to one embodiment of a work vehicle of the present invention.

As shown in FIG. 1, the combine harvester 1 includes a travel part 2, a mowing part 3, a threshing part 4, a sorting part 5, a reserving part 6, a discharged-straw processing part 7, a powering part 8, and the maneuvering part 9, and is configured as a so-called self-threshing type combine harvester. The combine harvester 1, while traveling by the travel part 2, threshes, by the threshing part 4, the grain culm mowed by the mowing part 3, sorts the grain by the sorting part 5, and stores the sorted grain in the reserving part 6. The combine harvester 1 causes the discharged-straw processing part 7 to process a discharged straw after the threshing. By power supplied by the powering part 8, the combine harvester 1 drives the travel part 2, the mowing part 3, the threshing part 4, the sorting part 5, the reserving part 6, and the discharged-straw processing part 7.

The travel part 2 is provided below a machine body frame 10, and includes a pair of right and left crawler-type travel devices 11 and a transmission (not shown). The travel part 2, by the power (for example, rotary power) transmitted from an engine 26 of the powering part 8, rotates the crawler of the crawler-type travel device 11, thereby to cause the combine harvester 1 to travel in the forward and backward directions or to turn to the right and left directions. The transmission sends the power (rotary power) of the powering part 8 to the crawler-type travel device 11, and also is capable of shifting the rotary power.

The mowing part 3 is provided in front of the travel part 2 and executes mowing work of rows within the maximum number of mowing rows, and a mowing width is determined according to the number of rows targeted for the mowing work. The mowing part 3 includes a divider 13, a raising device 14, a cutting device 15, and a conveying device 16. The divider 13 divides grasses of the grain culm of the farm field every one row, and guides, to the raising device 14, the grain culm of the given number of rows equal to or smaller than the maximum number of mowing rows. The raising device 14 raises the grain culm guided by the divider 13. The cutting device 15 cuts the grain culm raised by the raising device 14. To the threshing part 4, the conveying device 16 conveys the grain culm cut by the cutting device 15.

The threshing part 4 is provided behind the mowing part 3. The threshing part 4 includes a feed chain 18 and a handling body 19. The feed chain 18 conveys, for threshing, the grain culm conveyed from the conveying device 16 of the mowing part 3, and further conveys, to the discharged-straw processing part 7, the grain culm after the threshing, that is, the discharged straw. The handling body 19 threshes the grain culm conveyed by the feed chain 18.

The sorting part 5 is provided below the threshing part 4. The sorting part 5 includes a swing sorting device 21, a wind sorting device 22, a grain conveying device (not shown), and a straw waste discharging device (not shown). The swing sorting device 21 sifts the threshed matters dropped from the threshing part 4, thereby to sort the threshed matter into the grain and the straw waste, etc. By air blow, the wind sorting device 22 further sorts the threshed matters, which are sorted by the swing sorting device 21, into the grain, the straw waste, etc. To the reserving part 6, the grain conveying device conveys the grains sorted by the swing sorting device 21 and the wind sorting device 22. To the outside of the machine, the straw waste discharging device discharges the straw waste and the like sorted by the swing sorting device 21 and the wind sorting device 22.

The reserving part 6 is provided on the right side of the threshing part 4. The reserving part 6 includes a grain tank 23 and a discharge device 24. The grain tank 23 stores the grain conveyed from the sorting part 5. The discharge device 24 includes an auger or the like and executes the discharging work of the grains, thus discharging, to any place, the grains stored in the grain tank 23. The discharge device 24 executes the discharging work autonomously under the control by a control device 50 (see FIG. 2) or manually according to an operation of the maneuvering part 9.

The discharged-straw processing part 7 is provided behind the threshing part 4. The discharged-straw processing part 7 includes a discharged-straw conveying device (not shown) and a discharged-straw cutting device (not shown). For example; to the outside of the machine (behind or below the combine harvester 1, for example), the discharged-straw processing part 7 discharges, by the discharged straw conveying device, the discharged straw, as it is, conveyed from the feed chain 18 of the threshing part 4. Or, the discharged-straw processing part 7 conveys, by the discharged straw conveying device, the discharged straw to the discharged straw cutting device, and after cutting the discharged straw by the discharged straw cutting device, discharges the discharged straw to the outside of the machine (right side behind the combine harvester 1, for example).

The powering part 8 is provided above the travel part 2 and in front of the reserving part 6. The powering part 8 includes the engine 26 that generates rotary power. To the travel part 2, the mowing part 3, the threshing part 4, the sorting part 5, the reserving part 6, and the discharged-straw processing part 7, the powering part 8 sends the rotary power generated by the engine 26. Further, the combine harvester 1 includes a fuel tank (not shown) to tank a fuel to be supplied to the engine 26 of the powering part 8.

The maneuvering part 9 is provided above the powering part 8. As shown in FIG. 3; around a drive seat 28, the maneuvering part 9 includes operation tools for maneuvering the travel of the combine harvester 1, such as a steering wheel 29, a main speed-change lever 30, and an auxiliary speed-change lever 31. Further, the maneuvering part 9 includes a mechanism for operates the mowing work by the mowing part 3, the threshing work by the threshing part 4, and the discharging work by the discharge device 24 of the reserving part 6. Further, the maneuvering part 9 is provided with a display part 40 such as a monitor to display various information and output the information to the worker (see FIG. 2).

The drive seat 28 is a seat on which the worker sits, and is provided, for example, on the right part of the combine harvester 1. An armrest 32 is provided on the right side of the drive seat 28, and a handrail part 33 is provided in front of the armrest 32. An autonomous travel allowance switch 34, which is an example of an autonomous travel allowance operation member, is provided on the handrail part 33; the autonomous travel allowance switch 34 is placed, for example, in the handrail part 33's position where a finger of the right hand hangs in a state of the worker, who sits on the drive seat 28, having his/her right arm on the armrest 32. For example, the autonomous travel allowance switch 34 includes a press button, and may be configured by a so-called momentary type that is turned on when being operated (pressed), that is, when being pressed, and is turned off when the operating (pressing) is canceled, that is, when being not pressed.

The autonomous travel allowance switch 34 is for allowing for the autonomous travel, which is based on the travel route R, by being pressed when the autonomous travel mode is set. Further, the travel route R includes an allowance switch-requiring route R1 (allowance operation member-requiring route) in which the autonomous travel is allowed and executed in response to the pressing of the autonomous travel allowance switch 34 (operation of the autonomous travel allowance operation member), and an allowance switch-nonrequiring route R2 (allowance operation member-nonrequiring route) in which the autonomous travel is allowed and executed regardless of the pressing of the autonomous travel allowance switch 34 (operation of the autonomous travel allowance operation member) (see FIG. 4). In other words, even when the autonomous travel mode is set in the allowance switch-requiring route R1, the autonomous travel is not allowed and is not executed unless the autonomous travel allowance switch 34 is pressed. Details of the autonomous travel action of combine harvester 1, which action is in response to the operation of the autonomous travel allowance switch 34, are to be described below. Further, FIG. 4 shows the allowance switch-requiring route R1 by a broken line, and shows the allowance switch-nonrequiring route R2 by a dashed-dotted line.

To the travel part 2, the steering wheel 29 sends a turning operation by the worker, thereby to change a progressing direction of the combine harvester 1, that is, operates the steering of the combine harvester 1. When the manual travel mode is being set, for example, the travel part 2 ordinarily receives e the worker's steering operation of the steering wheel 29. Meanwhile, when the autonomous travel mode is being set, the travel part 2 does not receive the worker's steering operation of the steering wheel 29, but the combine harvester 1, when the steering wheel 29 is operated, switches the travel mode from the autonomous travel mode to the manual travel mode. The steering wheel 29 has a margin of about ±5 degrees in a rotary direction, and is so configured that any operation within this margin is not sent to the travel part 2. Further, the margin of the steering wheel 29 is not limited to ±5 degrees, and can be manually adjusted.

According to the operation by the worker, the main speed-change lever 30 and the auxiliary speed-change lever 31 switch a set speed of the travel of the combine harvester 1. When the manual travel mode is being set, for example, the main speed-change lever 30, when being in a neutral position 35 in the center, stops the combine harvester 1. Further, the main speed-change lever 30, when tilted to a forward speed-change area 36 on a front side of the neutral position 35, transmits the forward travel operation of the combine harvester 1 to the travel part 2, and sets, to the travel part 2, a forward set speed which is in response to the forward-backward position of the main speed-change lever 30 in the forward speed-change area 36 extending in the forward-backward direction. The main speed-change lever 30 positioned in the forward speed-change area 36, when tilted from the neutral side to the front side, increases the forward set speed; meanwhile, when tilted from forward to the neutral side, decreases the forward set speed.

Meanwhile, when the main speed-change lever 30 is tilted to a backward speed-change area 37 on a rear side of the neutral position 35, a backward travel operation of the combine harvester 1 is transmitted to the travel part 2, and a backward set speed, which is in response to the main speed-change lever 30's forward-backward position in the backward speed-change area 37 extending in the forward-backward direction, is set to the travel part 2. When the main speed-change lever 30 positioned in the backward speed-change area 37 is tilted from the neutral side to the rear side, the backward set speed is increased; meanwhile, when the main speed-change lever 30 is tilted from the rear side to the neutral side, the backward set speed is decreased.

Further, when the autonomous travel mode is set thereby, for the combine harvester 1, to execute the autonomous travel, the main speed-change lever 30 is positioned in the forward speed-change area 36. When the autonomous travel mode is set, it may be one of the conditions for starting the autonomous travel of the combine harvester 1 that the main speed-change lever 30 is positioned in the forward speed-change area 36. In the forward autonomous travel; the forward set speed, which is in response to the main speed-change lever 30's position in the forward-backward direction, is set to the travel part 2; for example, during the autonomous travel, when the main speed-change lever 30 is tilted from the neutral side to the front side, the forward set speed is increased, meanwhile, when the main speed-change lever 30 is tilted from forward to the neutral side, the forward set speed is decreased. Further, in the backward autonomous travel, a constant backward set speed is set to the travel part 2 regardless of the main speed-change lever 30's position in the forward-backward direction.

Figure 2:
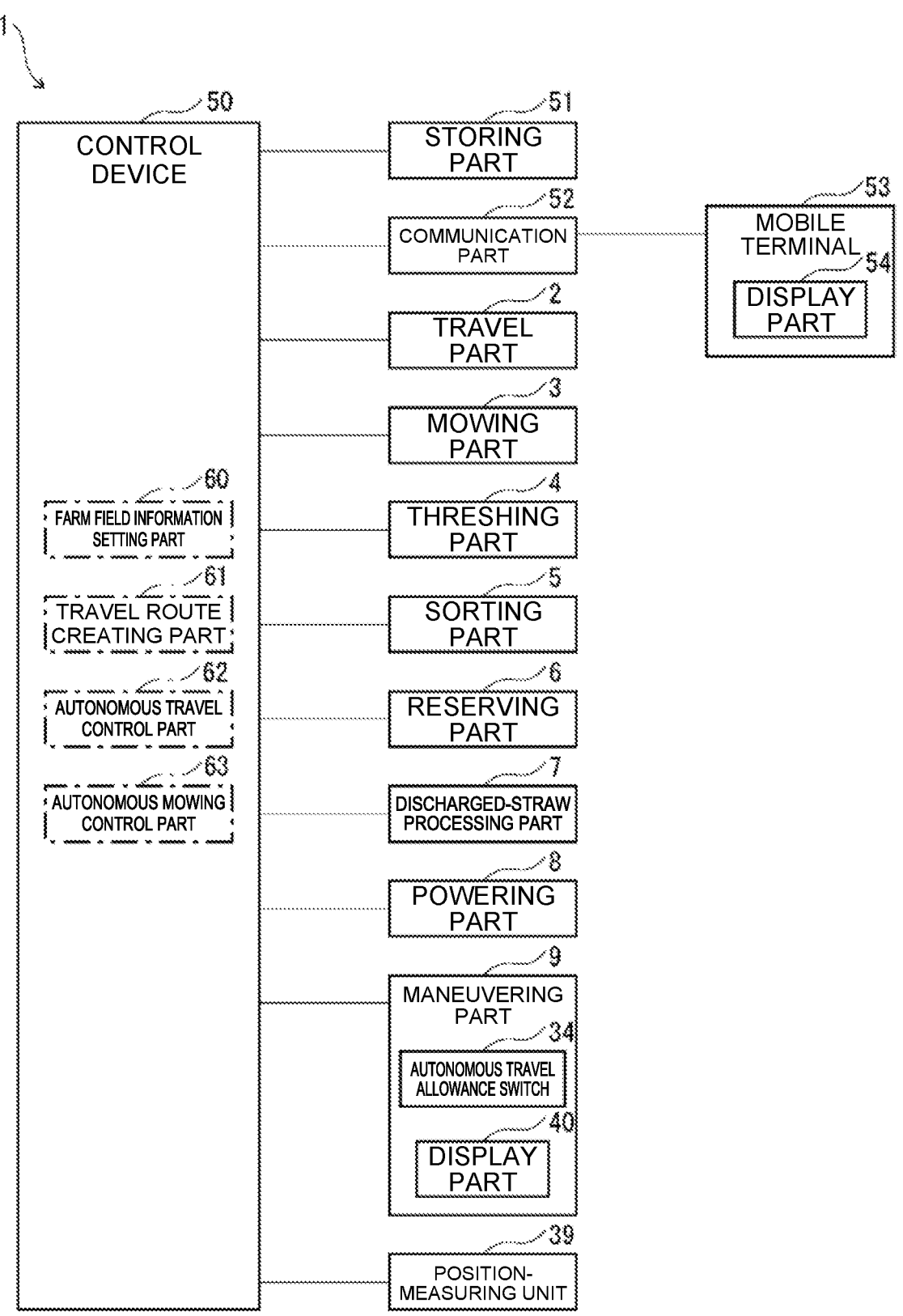
FIG. 2 is a block diagram of the combine harvester according to the one embodiment of the work vehicle of the present invention.
Figure 3:
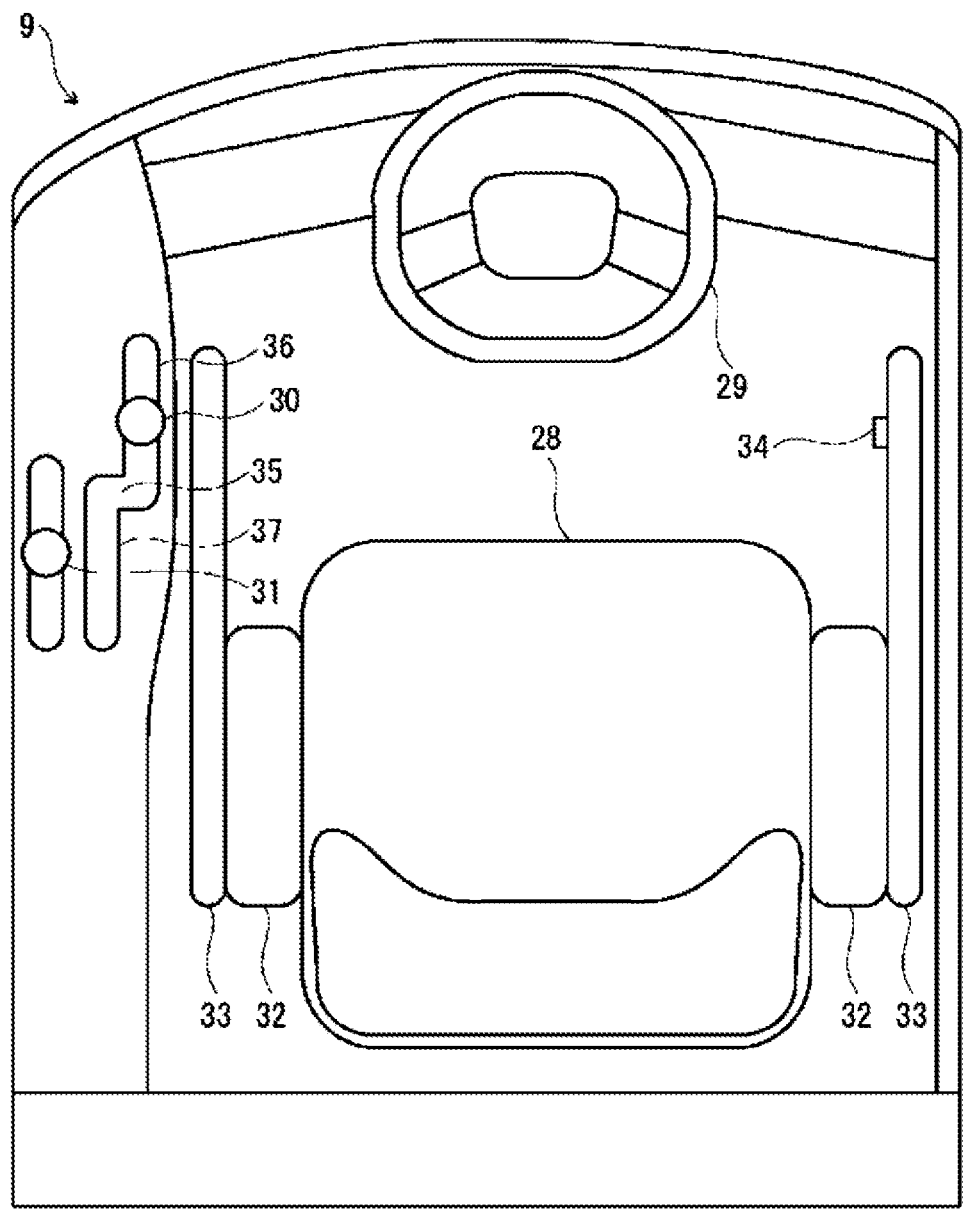
FIG. 3 is a plan view of a maneuvering part of the combine harvester according to the one embodiment of the work vehicle of the present invention.

As shown in FIG. 2, the combine harvester 1 includes a positioning unit 39 which uses a satellite positioning system such as GPS thereby to acquire position information of the combine harvester 1. The positioning unit 39 receives a positioning signal from a positioning satellite via a positioning antenna, and based on the positioning signal, acquires position information of the positioning unit 39, that is, the position information of the combine harvester 1.

It is noted that the combine harvester 1 may be so configured as to be communicable with a base station (not shown) placed at a ridge or the like around the farm field. The base station receives the positioning signal from the positioning satellite via the positioning antenna, and, based on the positioning signal, acquires the position information of the base station. To the combine harvester 1 (for example, positioning unit 39), the base station sends correction information which is based on position information of the base station. The combine harvester 1 (for example, positioning unit 39) receives the correction information from the base station, and, based on the correction information, corrects position information of the positioning unit 39, that is, the position information of the combine harvester 1.

Then, the control device 50 of the combine harvester 1 will be described with reference to FIG. 2. The control device 50 includes a computer such as a CPU, and is connected to a storing part 51 such as a ROM, a RAM, a hard disk drive and a flash memory, and to a communication part 52 that communicates with an external device. The storing part 51 stores programs and data for controlling various components and various functions of the combine harvester 1, and the control device 50 executes an arithmetic operation based on the programs and data stored in the storing part 51 thereby to control various components and various functions. The control device 50 controls the positioning unit 39, for example, thereby to acquire the position information of the combine harvester 1.

The storing part 51 stores, for example, farm field information of a farm field as the work target of the combine harvester 1. The farm field information includes shape, size, and position information (coordinates, etc.) of farm field ends included in the outer periphery of the farm field, as well as shape, size, and position information (coordinates, etc.) of the yet-to-be-mowed area of the farm field.

Via a wireless communication antenna, the communication part 52 is capable of wirelessly communicating with an external device such as a mobile terminal 53 possessed by the worker. The control device 50 controls the communication part 52 thereby to wirelessly communicate with the mobile terminal 53, thereby to send and receive various information to and from the mobile terminal 53.

The mobile terminal 53, which is one of component elements of the combine harvester 1 and is a terminal that can remotely operate the combine harvester 1, includes, for example, a tablet terminal provided with a touch screen, a laptop personal computer, or the like. The mobile terminal 53 is provided with a display part 54 such as a touch screen and a monitor for displaying and outputting various information to the worker, and is also provided with an input part such as a touch screen and an operation key for receiving, from the worker, an input operation of various information. Further, the maneuvering part 9 may be provided with an operation device similar to the mobile terminal 53. For example, the mobile terminal 53 displays, on the display part 54, a screen (for example, home screen or mode setting screen) capable of setting any of the manual travel mode and autonomous travel mode of the combine harvester 1, and sends, to the combine harvester 1, the travel mode set in response to the worker's operation.

The mobile terminal 53 is so configured, for the farm field information related to the farm field as the work target, as to receive the input operation via the input part, and for example, displays a farm field information setting screen capable of setting the farm field information. On the farm field information setting screen, the mobile terminal 53, while displaying the farm field map which is based on the farm field information, can also display the travel route R of the combine harvester 1 on a field map so that the proceeding direction of the travel route R can be seen. To the combine harvester 1, the mobile terminal 53 sends the farm field information set on the farm field information setting screen.

The mobile terminal 53 has a function to receive a selection of a travel pattern of the autonomous mowing travel of the combine harvester 1, and for creating the travel route R of the autonomous mowing travel, displays, on the display part 54, a screen (for example, travel selection screen) for selecting the travel pattern of the reciprocating mowing or turn mowing. To the combine harvester 1, the mobile terminal 53 sends the travel pattern (reciprocating mowing or turn mowing) input in response to the worker's operation, thereby give an instruction to create the travel route R.

Executing the program stored in the storing part 51, the control device 50 operates as a farm field information setting part 60, a travel route creating part 61, an autonomous travel control part 62, and an autonomous mowing control part 63. Further, the travel route creating part 61, the autonomous travel control part 62, and the autonomous mowing control part 63 realize, in the autonomous driving method according to the present invention, a travel route creating step, an autonomous travel control step, and an autonomous mowing control step, respectively. Further, the autonomous travel allowance switch 34 functions as a maneuvering part for operating whether or not to allow for the autonomous travel, and realizes the operation step of the autonomous driving method according to the present invention.

The farm field information setting part 60 autonomously or manually sets the farm field information related to the farm field as the work target, and stores the above information in the storing part 51. For example, the farm field information setting part 60 manually sets the farm field information in response to the operation to input the farm field information to the farm field information setting screen of the mobile terminal 53. Or, through a communication with a server (not shown), the farm field information setting part 60 may receive the farm field information stored in the server and autonomously set the farm field information. Further, in the farm field information setting part 60, the farm field information received from the server may be made editable by the farm field information setting screen of the mobile terminal 53.

Further, in another example, the farm field information setting part 60 may acquire a farm field image photographing the farm field as the work target and set the farm field information based on a result of analyzing the farm field image. Further, the farm field information setting part 60 may acquire more accurate field information by taking a consistency among the farm field information set according to the operation of the mobile terminal 53, the farm field information received from the server, and the farm field information analyzed from the farm field image.

The farm field image may be taken by a machine body camera provided in the combine harvester 1, the image taken by a fixed camera provided in the base station may be received by the communication part 52, the image taken by a mobile camera provided in the mobile terminal 53 may be received by the communication part 52, or the image taken by a helicopter shooting camera provided in a helicopter shooting device such as a drone may be received by the communication part 52. The farm field information setting part 60 may analyze the farm field information from the farm field image of one of the machine body camera, the fixed camera, the portable camera, and the helicopter shooting camera, or may analyze the farm field information from the farm field images of two or more cameras. Further, the control device 50 may cause the display part 40 of the maneuvering part 9 to display the farm field images taken by the machine body camera, the fixed camera, the mobile camera, or the aerial camera, or may cause the display part 54 of the mobile terminal 53 to display the farm field images having been sent to the mobile terminal 53.

The travel route creating part 61 creates the travel route R which is referred to for the combine harvester 1 to execute, by the autonomous driving, the autonomous travel and the autonomous mowing (autonomous mowing travel) in the farm field, and stores the travel route R in the storing part 51. The travel route R includes not only any travel setting related to the autonomous travel, but also any work setting related to any work such as the autonomous mowing. In addition to the travel position in the farm field, the travel setting includes the proceeding direction (steering direction and forward or backward) in each travel position. The work setting includes any information about the operation or stop of the mowing in each travel position, the mowing speed and mowing height, the number of mowing rows, and any other work.

For the yet-to-be mowed area in the farm field, the travel route creating part 61 straightly sets the work route for mowing while traveling in the forward direction; and the travel route creating part 61 combines plural work routes thereby to set the travel route R. Further, the travel route creating part 61 sets an idle travel route for turning and traveling on a headland between two consecutive work routes. That is, the travel route creating part 61 creates the travel route R including the plural work routes and the idle travel routes between the respective work routes. Further, for moving in a mowed area of the farm field, the travel route creating part 61 may also create, other than the work route and the idle travel route, the travel route R by setting a movement route for straightly traveling in the forward or backward direction or a movement route for traveling while turning.

The travel route creating part 61 creates the travel route R which is in response to the travel pattern (reciprocating mowing or turn mowing) selected in response to the operation of the mobile terminal 53 or the like. For example, the travel route creating part 61 creates the travel route R of the turn mowing in which the circumferential trip of the work route along the inner circumference of the yet-to-be mowed area is shifted to the center side and is repeated, or the travel route R of the reciprocating mowing for making reciprocating movements in plural work routes in the yet-to-be mowed area. In the travel route R, the travel route creating part 61 sets a start position S where the autonomous mowing travel is started and an end position E where the autonomous mowing travel is ended (see FIG. 4).

Further, for each route included in the created travel route R, the travel route creating part 61 autonomously sets, in response to the type of each route, any of the allowance switch-requiring route R1 (allowance operation member-requiring route) in which the autonomous travel is allowed and executed in response to the pressing of the autonomous travel allowance switch 34 (operation of the autonomous travel allowance operation member) and the allowance switch-nonrequiring route R2 (allowance operation member-nonrequiring route) in which the autonomous travel is allowed and executed regardless of the pressing of the autonomous travel allowance switch 34 (operation of the autonomous travel allowance operation member).

For example, the travel route creating part 61 sets the allowance switch-nonrequiring route R2 for the straight forward route such as the work route or the forward movement route. Further, the travel route creating part 61 sets the allowance switch-requiring route R1 for the straight backward route such as the backward movement route. Further, the travel route creating part 61 sets the allowance switch-requiring route R1 for the idle travel route between the work routes and the turn route such as the turn movement route. Further, the straight routes in the forward direction and the backward direction are not limited to a completely straight route, and include a route having a slight turn within a given allowable angle. Meanwhile, the turn route is a route having a turn equal to or greater than a given minimum turn angle.

As shown in FIG. 4; on the display part 40 of the maneuvering part 9 or the display part 54 of the mobile terminal 53, the travel route creating part 61 displays a travel route setting screen 70 for displaying the created travel route R, and outputs the travel route setting screen 70 to the worker. At this time, the travel route creating part 61 displays, on the travel route setting screen 70, the allowance switch-requiring route R1 and the allowance switch-nonrequiring route R2 which are set for the travel route R, for example, so as to be identifiable by different display modes (color, thickness, line type, and the like). Further, on the travel route setting screen 70, the travel route creating part 61 sets the start position S where the autonomous mowing travel is started and the end position E where the autonomous mowing travel is ended.

Further, the travel route creating part 61 may set, in an initial state, the travel route R in which the allowance switch-requiring route R1 and the allowance switch-nonrequiring route R2 are set in response to the type of each route, display the travel route R in the initial state on the travel route setting screen 70 of the maneuvering part 9 or the mobile terminal 53, and make editable the allowance switch-requiring route R1 or the allowance switch-nonrequiring route R2 of each route in response to the worker's operation of the input part of the maneuvering part 9 or the mobile terminal 53. In other words, the input part of the maneuvering part 9 or the mobile terminal 53 functions as a setting part capable of setting the allowance switch-requiring route R1 and the allowance switch-nonrequiring route R2.

For example, the setting part may have a cancellation button 71 for executing an operation of collectively canceling the already set allowance switch-requiring routes R1 and switching all to the allowance switch-nonrequiring routes R2, or an operation of collectively canceling the already set allowance switch-nonrequiring routes R2 and switching all to the allowance switch-requiring routes R1. Further, the cancellation button 71 may so function as to cancel the editing of the travel route R and return the travel route R to the initial state. Further, the setting part may have a switch button 72 for executing an operation of individually switching the already set allowance switch-requiring route R1 to the allowance switch-nonrequiring route R2 or an operation of individually switching the already set allowance switch-nonrequiring route R2 to the allowance switch-requiring route R1.

When the autonomous travel mode is set, the autonomous travel control part 62 controls the powering part 8 and the travel part 2 based on the travel setting of the travel route R created by the travel route creating part 61, thereby to cause the autonomous travel, which is in response to the travel route R, to be executed. Further, the combine harvester 1 may be provided with a gyro sensor and an orientation sensor thereby to acquire the displacement information and orientation information of the combine harvester 1, and the autonomous travel control part 62 may adjust the autonomous travel of the combine harvester 1 based on the displacement information and the orientation information.

When the steering wheel 29 is operated during the execution of the autonomous travel, the autonomous travel control part 62 switches the travel mode from the autonomous travel mode to the manual travel mode. Further, the autonomous travel control part 62 sets, as the set speed of the autonomous travel, the forward set speed or the constant backward set speed each of which is in response to the forward-backward position of the main speed-change lever 30; meanwhile, when the main speed-change lever 30 is operated during the autonomous forward travel, the autonomous travel control part 62 changes the set speed of the autonomous travel in response to the position of the main speed-change lever 30. For example, when the main speed-change lever 30 positioned in the forward speed-change area 36 is tilted forward from the neutral side during the autonomous travel, the autonomous travel control part 62 increases the forward set speed regardless of the forward set speed set for the travel route R; meanwhile, when the main speed-change lever 30 is tilted from forward to the neutral side, the autonomous travel control part 62 decreases the forward set speed regardless of the forward set speed set for the travel route R.

When the autonomous travel mode is set, the autonomous mowing control part 63 controls the powering part 8 and the mowing part 3 based on the work setting of the travel route R created by the travel route creating part 61, thereby to cause the autonomous mowing, which is in response to the travel route R, to be executed. The autonomous mowing control part 63 causes the mowing part 3 to autonomously mow the yet-to-be mowed grain culms on the travel route R. Further, along with the autonomous mowing, the autonomous mowing control part 63 controls the threshing part 4, the sorting part 5, the reserving part 6 and the discharged-straw processing part 7, thereby to cause the above respective parts to autonomously execute threshing of the grain culm after the mowing, sorting of the grains and straw waste after the threshing, storing of grains after the sorting, and processing of the straw waste after the threshing.

Figure 5:
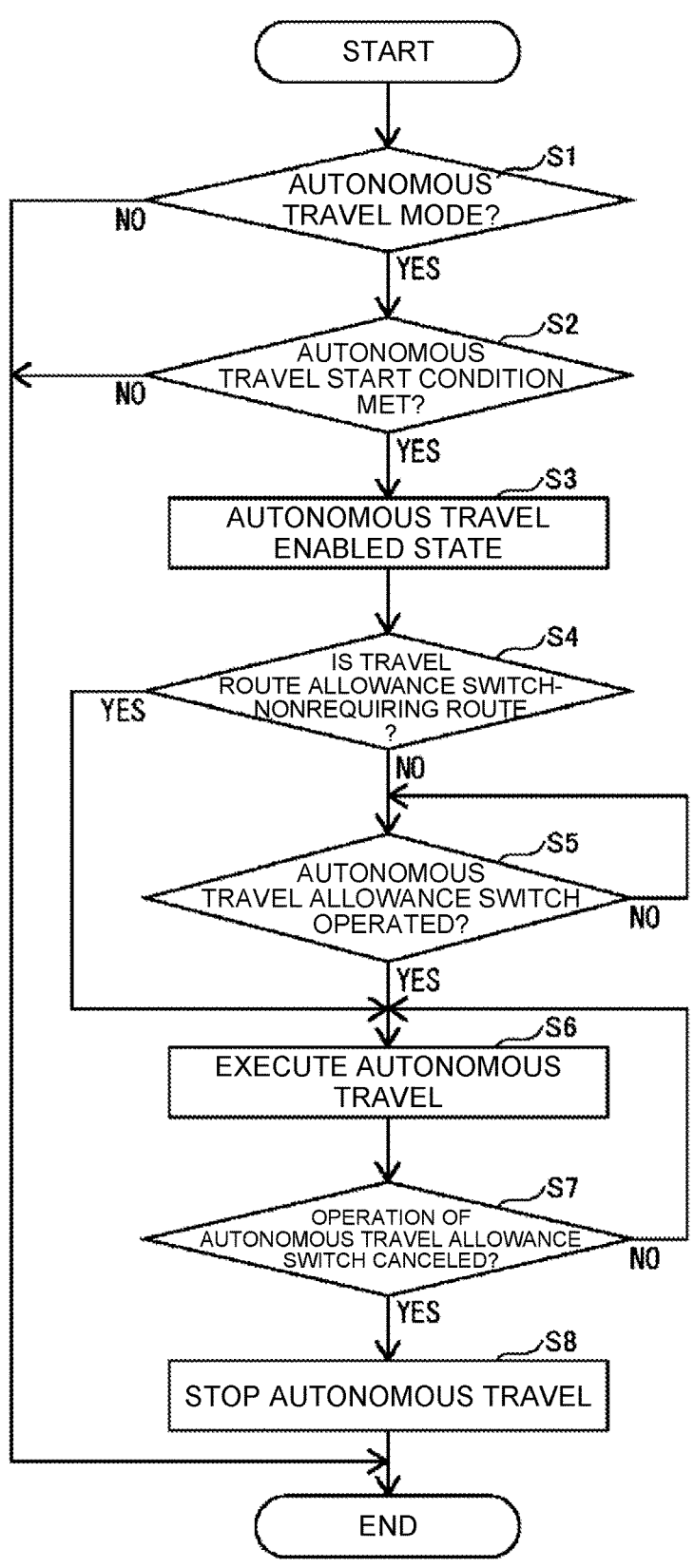
FIG. 5 is a flowchart of an autonomous travel action of the combine harvester according to the one embodiment of the work vehicle of the present invention.

In particular, the autonomous travel control part 62 controls the autonomous travel action of the combine harvester 1 which action is in response to the operation of the autonomous travel allowance switch 34. An example of the autonomous travel action of the combine harvester 1 is to be described with reference to a flowchart in FIG. 5. When the autonomous travel mode is being set (step S1 Yes), and the combine harvester 1 meets various autonomous travel start conditions (step S2 Yes), the autonomous travel control part 62 accomplishes a state of capable of starting the autonomous travel, that is, an autonomous travel enabled state (step S3). Further, when the autonomous travel mode is not being set (step S1: No) or when the autonomous travel start conditions are not met (step S2: No), the autonomous travel action is not executed.

In the case where the travel route R is the allowance switch-nonrequiring route R2 in the autonomous travel enabled state (step S4: Yes), the autonomous travel control part 62 allows for the autonomous travel regardless of the pressing of the autonomous travel allowance switch 34 and executes the autonomous travel (step S6). Further, when the travel route R is the allowance switch-requiring route R1 in the autonomous travel enabled state (step S4: No), the autonomous travel control part 62 allows for the autonomous travel and executes the autonomous travel (step S6) in response to the pressing of the autonomous travel allowance switch 34 (step S5: Yes); meanwhile, when the autonomous travel allowance switch 34 is not pressed (step S5: No), the autonomous travel control part 62 does not allows for the autonomous travel and does not execute the autonomous travel.

To be specific, when the autonomous travel allowance switch 34 is of the momentary type; in the allowance switch-requiring route R1 (step S4: No), the autonomous travel control part 62 executes the autonomous travel (step S6) while the autonomous travel allowance switch 34 is being pressed (step S5: Yes). Further, when the autonomous travel allowance switch 34 is being pressed and the autonomous travel is being executed, if the pressing of the autonomous travel allowance switch 34 is canceled (step S7: Yes), the autonomous travel control part 62 stops (temporarily interrupts) the autonomous travel (step S8). Further, when the pressing of the autonomous travel allowance switch 34 is canceled and the autonomous travel is stopped, pressing again the autonomous travel allowance switch 34 causes the autonomous travel control part 62 to restart the autonomous travel. In this way, when the pressing of the autonomous travel allowance switch 34 is canceled thereby to stop the autonomous travel, the autonomous travel control part 62 may move to step S1, or may move to step S7 that waits for the operation of the autonomous travel allowance switch 34 while storing the cancellation state of the pressing of the autonomous travel allowance switch 34.

Further, the autonomous travel control part 62, at time of switching from the allowance switch-nonrequiring route R2, in which the autonomous travel is being executed, to the allowance switch-requiring route R1, sets, in the allowance switch-nonrequiring route R2, a given preparation section immediately before the allowance switch-requiring route R1. When the autonomous travel allowance switch 34 is pressed in the preparation section of the allowance switch-nonrequiring route R2, the autonomous travel control part 62, without stopping the autonomous travel, continues the autonomous travel in the allowance switch-nonrequiring route R2 and the allowance switch-requiring route R1, and shifts to the allowance switch-requiring route R1. To be more specific, in the case where the autonomous travel allowance switch 34 is of the momentary type; when the autonomous travel allowance switch 34 is being pressed from the preparation section of the allowance switch-nonrequiring route R2 to the allowance switch-requiring route R1, the autonomous travel control part 62 continues the autonomous travel in the allowance switch-nonrequiring route R2 and the allowance switch-requiring route R1. Meanwhile, in the case where the autonomous travel allowance switch 34 is not being pressed in the preparation section of the allowance switch-nonrequiring route R2, the autonomous travel control part 62 stops the autonomous travel before shifting to the allowance switch-requiring route R1.

Further, in the case where the travel route R is the allowance switch-requiring route R1 in the autonomous travel enabled state, the autonomous travel control part 62 may notify the worker, by the screen display of the display part 40 of the maneuvering part 9 or of the display part 54 of the mobile terminal 53, that the autonomous travel start condition is met and the autonomous travel is executed by the operation of the autonomous travel allowance switch 34. Further, the autonomous travel allowance switch 34 may include, for example, an LED, and may be so configured as to change the coloring of the LED between the case where the combine harvester 1 meets various autonomous travel start conditions, the autonomous travel control part 62 is in the autonomous travel enabled state, and the travel route R is the allowance switch-requiring route R1, and the other case.

Further, when the combine harvester 1, in the autonomous travel in the allowance switch-nonrequiring route R2, enters the preparation section immediately before the allowance switch-requiring route R1, the autonomous travel control part 62 may notify the worker, by the screen display of the display part 40 of the maneuvering part 9 or of the display part 54 of the mobile terminal 53, that the route is about to switch from the allowance switch-nonrequiring route R2 to the allowance switch-requiring route R1 or that the autonomous travel allowance switch 34 needs to be operated so as to continue the autonomous travel in the allowance switch-requiring route R1.

Further, when the autonomous travel is being executed in the allowance switch-requiring route R1, the autonomous travel control part 62 may continue the autonomous travel for a given duration time or duration distance after the pressing of the autonomous travel allowance switch 34 is canceled, and then may stop the autonomous travel. In this case, the autonomous travel control part 62 may continue the autonomous travel by setting a speed lower than the forward set speed or the constant backward set speed which is in response to the position of the main speed-change lever 30, or may gradually decrease the set speed until the autonomous travel is stopped. Further, even while the autonomous travel for the given duration time or duration distance is continued, the autonomous travel control part 62 may immediately stop the autonomous travel in response to the operation of a vehicle-stop button provided for the maneuvering part 9 or mobile terminal 53 or in response to the speed-decreasing operation of the main speed-change lever 30. Or, the autonomous travel control part 62, when the pressing of the autonomous travel allowance switch 34 is canceled, may immediately stop the autonomous travel.

Further, the autonomous travel control part 62 may notify the worker, by voice output or by the screen display of the display part 40 of the maneuvering part 9 or of the display part 54 of the mobile terminal 53, that the pressing of the autonomous travel allowance switch 34 is canceled in the allowance switch-requiring route R1 thereby to have caused deceleration, or that the autonomous travel is stopped after an elapse of the given duration time or duration distance.

For continuing the autonomous travel after the pressing of the autonomous travel allowance switch 34 is canceled in the allowance switch-requiring route R1, the autonomous travel control part 62 does not reflect the speed-increasing operation on the set speed even when the main speed-change lever 30 is operated and the speed-increasing operation of the set speed is executed. In this case, the autonomous travel control part 62, when the autonomous travel allowance switch 34 is pressed again thereby to restart the autonomous travel, reflects the operation of increasing the set speed which operation is seen when the pressing of the autonomous travel allowance switch 34 is canceled.

The autonomous travel control part 62 sets the given duration time or duration distance, which is for continuing the autonomous travel after the pressing of the autonomous travel allowance switch 34 is canceled in the allowance switch-requiring route R1, to be shorter in the backward travel than in the forward travel, or to be 0 in the backward travel. In other words, the autonomous travel control part 62 may set the duration time for the backward travel to be shorter than the duration time for the forward travel, and preferably, when the pressing of the autonomous travel allowance switch 34 is canceled during the backward autonomous travel, may immediately stop without continuing the autonomous travel.

When a change operation of the drive conditions (for example, the set speed or steering of the travel, and mowing height of mowing) of the combine harvester 1 is executed by the operation of the maneuvering part 9 or mobile terminal 53 during a period from the cancelation of the pressing of the autonomous travel allowance switch 34 in the allowance switch-requiring route R1 to the stop of the autonomous travel, that is, during the given duration time or duration distance which is for continuing the autonomous travel, the autonomous travel control part 62 may extend the duration time or the duration distance, or may reset the count of the duration time or the duration distance. The operation to change the drive conditions during when the pressing of the autonomous travel allowance switch 34 is canceled may be reflected during the duration of the autonomous travel, or may be reflected when the autonomous travel allowance switch 34 is pressed again.

Further, the extension of the duration or the duration distance may be the same as the initial duration or the initial duration distance; for example, when the initial duration time is 5 seconds and the main speed-change lever 30 is operated within 5 seconds after the pressing of the autonomous travel allowance switch 34 is canceled, the duration time is extended by 5 seconds to be set to 10 seconds. Further, if another operation is executed within 10 seconds after the pressing of the autonomous travel allowance switch 34 is canceled, the duration time is extended by 5 seconds to be set to 15 seconds.

Or, when the operation for changing the drive condition of the combine harvester 1 is executed by the operation of the maneuvering part 9 or mobile terminal 53 during the given duration time or duration distance after the pressing of the autonomous travel allowance switch 34 is canceled in the allowance switch-requiring route R1, the autonomous travel control part 62 may prohibit the stop of the autonomous travel instead of the extending of the duration time or the duration distance.

Further, in the case where the forward or backward route along the travel route R ends and the route enters the turn route when the autonomous travel is being continued after the pressing of the autonomous travel allowance switch 34 is canceled in the allowance switch-requiring route R1, the autonomous travel control part 62 may stop the autonomous travel.

As described above, according to the present embodiment, the combine harvester 1 as the example of the work vehicle is a work vehicle that executes the autonomous travel based on the preset travel route R, and includes the autonomous travel allowance switch 34 as the example of the autonomous travel allowance operation member that allows for the autonomous travel, the travel route creating part 61 that creates the travel route R having the allowance switch-nonrequiring route R2 (allowance operation member-nonrequiring route) and the allowance switch-requiring route R1 (allowance operation member-requiring route), and the control device 50 that functions as the autonomous travel control part 62 that controls the autonomous travel which is based on the travel route R. The autonomous travel control part 62, in the allowance switch-nonrequiring route R2, executes the autonomous travel regardless of the operation (pressing) of the autonomous travel allowance switch 34; meanwhile, in the allowance switch-requiring route R1 executes the autonomous travel when the autonomous travel is allowed in response to the operation (pressing) of the autonomous travel allowance switch 34.

Thus, the combine harvester 1, in the allowance switch-requiring route R1, executes the autonomous travel, which is based on the travel route R, while the worker is pressing the autonomous travel allowance switch 34; thus, the autonomous travel is not continued only by mistakenly touching the autonomous travel allowance switch 34, making it possible to suppress the autonomous travel not intended by the worker, and making it possible to enhance safety. Further, the allowance switch-requiring route R1 may be set for a route having a high risk priority and requiring attention, and the allowance switch-nonrequiring route R2 can be set for a route having a low risk priority, thus making it possible to suppress the autonomous travel allowance switch 34's operation to a necessary minimum, and making it possible to improve workability (work efficiency).

In the combine harvester 1 of the present embodiment, the travel route creating part 61 sets, as the allowance switch-nonrequiring route R2, the forward route included in the travel route R.

In the forward route; so as to change the travel condition of the combine harvester 1, the maneuvering part 9 (for example, the steering wheel 29 or the main speed-change lever 30) or the mobile terminal 53 is frequently operated. Further, in the forward route, the risk priority at the time of the autonomous travel is lower than in the backward route. According to the combine harvester 1 of the present embodiment, the operation of the autonomous travel allowance switch 34 is not set as a condition for the autonomous travel; thus, the operation of the maneuvering part 9, the mobile terminal 53, and the like can be executed while continuing the autonomous travel, making it possible to improve the operability.

Further, in the combine harvester 1 of the present embodiment, the travel route creating part 61 sets, as the allowance switch-requiring route R1, the backward route included in the travel route R. Further, the travel route creating part 61 sets, as the allowance switch-requiring route R1, the turn route included in the travel route R.

As a result, the risk priority is high at the time of the backward travel and at the time of shifting to the backward travel, as well as at the time of the turn travel and at the time of shifting to the turn travel; thus, setting the autonomous travel allowance switch 34's operation as the condition for the autonomous travel can enhance safety.

In the combine harvester 1 of the present embodiment, the autonomous travel control part 62, in the allowance switch-requiring route R1, executes the autonomous travel while the autonomous travel allowance switch 34 is being pressed, meanwhile, stops the autonomous travel when the pressing of the autonomous travel allowance switch 34 is canceled.

Thus, the combine harvester 1, in the allowance switch-requiring route R1, executes the autonomous travel, which is based on the travel route R, while the worker is pressing the autonomous travel allowance switch 34; thus, the autonomous travel is not continued only by mistakenly touching the autonomous travel allowance switch 34, making it possible to suppress the autonomous travel not intended by the worker. Further, the worker can stop the combine harvester 1 only by releasing the autonomous travel allowance switch 34, thus making it possible to immediately stop the combine harvester 1 when the risk priority is high.

Further, in the combine harvester 1 of the present embodiment; at the time of switching from the allowance switch-nonrequiring route R2, in which the autonomous travel is being executed, to the allowance switch-requiring route R1, the autonomous travel control part 62, if the autonomous travel allowance switch 34, in the allowance switch-nonrequiring route R2, is pressed in the given preparatory section present immediately before the allowance switch-requiring route R1, continues the autonomous travel in the allowance switch-nonrequiring route R2 and the allowance switch-requiring route R1 without stopping the autonomous travel and shifts to the allowance switch-requiring route R1, meanwhile, if the autonomous travel allowance switch 34 is not pressed in the preparatory section, stops the autonomous travel before shifting to the allowance switch-requiring route R1.

With this, in the case where the route is switched from the allowance switch-nonrequiring route R2 to the allowance switch-requiring route R1, the operation of the autonomous travel allowance switch 34 is set as the condition for the autonomous travel, thereby making it possible to suppress the autonomous travel not intended by the worker.

Further, in the combine harvester 1 of the present embodiment, the display parts 40 and 54 for displaying the travel route R are provided in the maneuvering part 9 and the mobile terminals 53; in different display modes, the display parts 40 and 54 display the allowance switch-nonrequiring route R2 and the allowance switch-requiring route R1 which are in the travel route R. Further, the display part 40 of the maneuvering part 9 and the display part 54 of the mobile terminal 53 realize a display step of the autonomous driving method according to the present invention.

With this, the worker can visually distinguish and determine the allowance switch-nonrequiring route R2 and the allowance switch-requiring route R1.

Further, in the combine harvester 1 of the present embodiment, the maneuvering part 9 and the mobile terminals 53 each include the setting part capable of setting, for the travel route R, the allowance switch-nonrequiring route R2 and the allowance switch-requiring route R1. Further, the input part of the maneuvering part 9 or the mobile terminal 53 realizes the setting step of the autonomous driving method according to the present invention.

With this, the worker can optionally select the allowance switch-nonrequiring route R2 or the allowance switch-requiring route R1 for each route included in the travel route R, making it possible to ensure workability and security according to the intention of the worker.

Further, in the above embodiment, the example has been described in which the autonomous travel allowance switch 34 is of the momentary type, is turned on when the worker is operating (pressing) the autonomous travel allowance switch 34, and the autonomous travel control part 62 executes the autonomous travel in the allowance switch-requiring route R1; the present invention is, however, not limited to this example. For example, in the other example, the autonomous travel allowance switch 34 may be so configured that pressing and holding the autonomous travel allowance switch 34 for a given time (for example, 5 seconds) or more causes the autonomous travel allowance switch 34 to be put in such a state (pressed-locked) as to remain operated (pressed) even after being released. In this case, operating (pressing) again the autonomous travel allowance switch 34 cancels the pressed-locked state.

When the autonomous travel allowance switch 34 is in the pressed-locked state, the autonomous travel control part 62 continuously executes the autonomous travel; when the route for executing the autonomous travel enters the turn route from the straight route or enters the backward route from the forward route, however, the pressed-locked state may be maintained, or the pressed-locked state may be canceled thereby to stop the autonomous travel. Further, the autonomous travel allowance switch 34 may make it possible to switch to the pressed-locked state in the case of the forward autonomous travel, meanwhile, may prohibit the switching to the pressed-locked state in the case of the backward autonomous travel.

Further, in the above embodiment, the example has been described in which the autonomous travel allowance switch 34 is of the momentary type; the present invention is, however, not limited to this example. For example, in another example, the autonomous travel allowance switch 34 may be of a so-called alternate type (one touch type) that is switched on and off every time the autonomous travel allowance switch 34 is pressed.

To be specific, in the case where the autonomous travel allowance switch 34 is of the one touch switch type, the autonomous travel control part 62, in the allowance switch-requiring route R1, executes the autonomous travel when the autonomous travel allowance switch 34 is pressed and switched to the on state. Further, while the autonomous travel allowance switch 34 is in the on state and the autonomous travel is being executed, the autonomous travel control part 62, when the autonomous travel allowance switch 34 is pressed and switched to the off state, stops the autonomous travel. Further, when the pressing of the autonomous travel allowance switch 34 is canceled and the autonomous travel is stopped, pressing again the autonomous travel allowance switch 34 causes the autonomous travel control part 62 to restart the autonomous travel.

In this case, at the time of switching from the allowance switch-nonrequiring route R2, in which the autonomous travel is being executed, to the allowance switch-requiring route R1, the autonomous travel control part 62, if the autonomous travel allowance switch 34 is pressed and switched to the on state at any position in the preparation section of the allowance switch-nonrequiring route R2, may continue the autonomous travel in the allowance switch-nonrequiring route R2 and the allowance switch-requiring route R1 without stopping the autonomous travel and shift to the allowance switch-requiring route R1. Meanwhile, in the case where the autonomous travel allowance switch 34 is not pressed and is in the off state in the preparation section of the allowance switch-nonrequiring route R2, the autonomous travel control part 62 stops the autonomous travel before shifting to the allowance switch-requiring route R1.

Further, in the above embodiment, the example has been described in which the travel route creating part 61 sets, in the initial state, the travel route R in which the allowance switch-requiring route R1 and the allowance switch-nonrequiring route R2 are autonomously set in response to the type of each route; the present invention is, however, not limited to this example. For example, in another example, the travel route creating part 61 may set, in the initial state, the travel route R in which the allowance switch-nonrequiring route R2 is set for all the routes, and, as in the above example, may make editable the allowance switch-requiring route R1 or the allowance switch-nonrequiring route R2 of each route of the travel route R in the initial state. Or, the travel route creating part 61, from the storing part 51, may read out the travel route R including the allowance switch-requiring route R1 and the allowance switch-nonrequiring route R2 which are set, for the farm field as the work target, in the autonomous mowing travel of the previous year and thereby may set the travel route R in the initial state, and, as in the above example, may make editable the allowance switch-requiring route R1 or the allowance switch-nonrequiring route R2 of each route of the travel route R in the initial state.

In the above embodiments, the example has been described in which the armrest 32 and the handrail part 33 are provided on the right side of the drive seat 28, and the autonomous travel allowance switch 34 is provided at the handrail part 33 on the right side; the present invention is, however, not limited to this example. For example, in another example, the armrest 32 and the handrail part 33 may be provided on the left side of the drive seat 28, and the autonomous travel allowance switch 34 may be provided at the handrail part 33 on the left side. Or, in another example, the armrests 32 and the handrail parts 33 may be provided on both the left and right sides of the drive seat 28, and the autonomous travel allowance switches 34 may be provided on the handrail parts 33 on both sides.

Or, in the other example; in the cabin of the maneuvering part 9, the autonomous travel allowance switch 34 may be provided in a position other than the armrest 32 and handrail part 33 (for example, steering wheel 29 or main speed-change lever 30), or the autonomous travel allowance switch 34 may be provided on the mobile terminal 53.

In the above embodiments, the example has been described in which the autonomous travel control part 62 executes the autonomous travel when the autonomous travel mode is set and the combine harvester 1 meets various autonomous travel start conditions thereby to have accomplished the autonomous travel enabled state, and when the autonomous travel allowance switch 34 is being pressed; the present invention is, however, not limited to this example. For example, in the other embodiment; the autonomous travel control part 62 may be so configured that, even when the autonomous travel enabled state is accomplished, the autonomous travel control part 62 executes the autonomous travel if the autonomous travel allowance switch 34 is being pressed after receiving a start instruction in response to the operation of the autonomous travel start button provided at the maneuvering part 9 or the mobile terminal 53.

For example, the mobile terminal 53 has the function of receiving the start of the autonomous travel (autonomous mowing travel) of the combine harvester 1, and displays, on the display part 54, the autonomous travel execution screen having the start button of the autonomous travel. The autonomous travel execution screen, when the autonomous travel mode is set and the combine harvester 1 meets various autonomous travel start conditions, causes the start button to be operably displayed. In response to the operation of the start button of the autonomous travel execution screen, the mobile terminal 53 sends, to the combine harvester 1, an instruction to start the autonomous travel.

Further, in the above embodiments, the example has been described in which the autonomous travel allowance switch 34 includes the press button; the present invention is, however, not limited to this example. For example, the autonomous travel allowance switch 34 may include a lever provided integrally with the handrail part 33 and steering wheel 29, and it may be so made that the worker grips the lever together with the handrail part 33 or the steering wheel 29 thereby to keep pressing the autonomous travel allowance switch 34.

In the above embodiment; the example has been described in which, in the travel route R for the combine harvester 1 to execute the autonomous mowing travel in the farm field, the allowance switch-requiring route R1 in which the autonomous travel is allowed and executed in response to the pressing of the autonomous travel allowance switch 34 and the allowance switch-nonrequiring route R2 in which the autonomous travel is allowed and executed regardless of the pressing of the autonomous travel allowance switch 34 are set; the present invention is, however, not limited to this example. For example, in another example; the allowance switch-requiring route R1 and the allowance switch-nonrequiring route R2 may be set for a discharge route for the combine harvester 1 to move from an interruption position in which the combine harvester 1 has interrupted the autonomous mowing travel in the farm field or from the end position E in which the combine harvester 1 has ended the autonomous mowing travel to a discharge position in which the discharge device 24 executes the discharge work of the grains. Further, in another example; when the combine harvester 1 executes the mowing work over plural farm fields, the allowance switch-requiring route R1 and the allowance switch-nonrequiring route R2 may be set for a movement route for the combine harvester 1 to move between the farm fields.

In the above embodiments, the example has been described in which the control device 50 of the combine harvester 1 functions as the farm field information setting part 60, the travel route creating part 61, the autonomous travel control part 62, and the autonomous mowing control part 63; the present invention is, however, not limited to this example. For example, in the other embodiment; it may be so configured that the mobile terminal 53 functions as the farm field information setting part 60, the travel route creating part 61, the autonomous travel control part 62, and the autonomous mowing control part 63. In other words, the autonomous driving system according to the present invention applies at least one of the control device 50 and mobile terminals 53 of the combine harvester 1 thereby to function as the farm field information setting part 60, the travel route creating part 61, the autonomous travel control part 62, and the autonomous mowing control part 63; the autonomous travel control part 62, in the allowance switch-nonrequiring route R2, may execute the autonomous travel regardless of the operation of the autonomous travel allowance switch 34, meanwhile in the allowance switch-requiring route R1, may execute the autonomous travel when the autonomous travel is allowed in response to the operation of the autonomous travel allowance switch 34.

In the above embodiments, the example has been described in which the work vehicle of the present invention includes the self-threshing type combine harvester 1; the present invention is, however, not limited to this example; the work vehicle of the present invention may include a passenger work vehicle such as an ordinary combine harvester, a tractor, a passenger mower, a passenger rice transplanter, a transport vehicle, a snowplow and a wheel loader, or an unmanned work vehicle such as an unmanned mower.

The present invention may be properly modified within the range not contrary to the gist or idea of an invention understandable from the claims and the entire specification, and the autonomous driving method, the work vehicle, and the autonomous driving system with the above modification are also included in the technical idea of the present invention.

DESCRIPTION OF REFERENCE NUMERALS 1 combine harvester (work vehicle)
2 travel part
9 maneuvering part
28 drive seat
29 steering wheel
30 main speed-change lever
32 armrest
33 handrail part
34 autonomous travel allowance switch (autonomous travel allowance operation member)

50 control device
51 storing part
53 mobile terminal
60 farm field information setting part
61 travel route creating part
62 autonomous travel control part
63 autonomous mowing control part
R travel route
R1 allowance switch-requiring route (allowance operation member-requiring route)
R2 allowance switch-nonrequiring route (allowance operation member-nonrequiring route)

The invention claimed is:

1. An autonomous driving method of a work vehicle that executes an autonomous travel based on a preset travel route, the autonomous driving method comprising:

an operating step for operating an autonomous travel allowance operation member that allows for the autonomous travel;

a travel route creation step for creating the travel route having an allowance operation member-nonrequiring route and an allowance operation member-requiring route; and an autonomous travel control step for controlling the autonomous travel which is based on the travel route, wherein the autonomous travel control step, in the allowance operation member-nonrequiring route, allows and executes the autonomous travel regardless of the operation of the autonomous travel allowance operation member, and the autonomous travel control step, in the allowance operation member-requiring route, determines whether or not the autonomous travel allowance operation member is being operated, and allows and executes the autonomous travel while operating the autonomous travel allowance operation member, and does not allow nor execute the autonomous travel while the autonomous travel allowance operation member is not operated.

2. The autonomous driving method according to claim 1, wherein the travel route creation step sets, as the allowance operation member-nonrequiring route, a forward route included in the travel route.

3. The autonomous driving method according to claim 1, wherein the travel route creation step sets, as the allowance operation member-requiring route, a backward route included in the travel route.

4. The autonomous driving method according to claim 1, wherein the travel route creation step sets, as the allowance operation member-requiring route, a turn route included in the travel route.

5. The autonomous driving method according to claim 1, wherein the autonomous travel control step, in the allowance operation member-requiring route, executes the autonomous travel while the autonomous travel allowance operation member is being operated, and, stops the autonomous travel when the operation of the autonomous travel allowance operation member is canceled.

6. The autonomous driving method according to claim 1, wherein at the time of switching from the allowed operation member-nonrequiring route, in which the autonomous travel is being executed, to the allowance operation member-requiring route, the autonomous travel control step, if the autonomous travel allowance operation member, in the allowed operation member-nonrequiring route, is operated in a given preparation section immediately before the allowance operation member-requiring route, the autonomous travel is continued in the allowed operation member-nonrequiring route and the allowance operation member-requiring route without stopping the autonomous travel and shifts to the allowance operation member-requiring route, and, if the autonomous travel allowance operation member is not operated in the given preparation section, stops the autonomous travel before shifting to the allowance operation member-requiring route.

7. The autonomous driving method according to claim 1, further comprising:

a display step that displays the travel route, wherein the display step displays the allowance operation member-nonrequiring route and the allowance operation member-requiring route which are in the travel route, in different display modes from each other.

8. The autonomous driving method according to claim 1, further comprising:

a setting step capable of setting, for the travel route, the allowance operation member-nonrequiring route and the allowance operation member-requiring route.

9. A work vehicle that executes an autonomous travel based on a preset travel route, the work vehicle comprising:

an autonomous travel allowance operation member for allowing the autonomous travel;

a travel route creating part for creating the travel route having an allowance operation member-nonrequiring route and an allowance operation member-requiring route; and an autonomous travel control part for controlling the autonomous travel which is based on the travel route, wherein the autonomous travel control part, in the allowance operation member-nonrequiring route, allows and executes the autonomous travel regardless of the operation of the autonomous travel allowance operation member, and the autonomous travel control part, in the allowance operation member-requiring route, determines whether or not the autonomous travel allowance operation member is being operated, and allows and executes the autonomous travel while operating the autonomous travel allowance operation member, and does not allow nor execute the autonomous travel while the autonomous travel allowance operation member is not operated.

10. An autonomous driving system provided with a work vehicle that executes an autonomous travel based on a preset travel route, the autonomous driving system comprising:

an autonomous travel allowance operation member for allowing the autonomous travel;

a travel route creating part for creating the travel route having an allowance operation member-nonrequiring route and an allowance operation member-requiring route; and an autonomous travel control part for controlling the autonomous travel which is based on the travel route, wherein the autonomous travel control part, in the allowance operation member-nonrequiring route, allows and executes the autonomous travel regardless of the operation of the autonomous travel allowance operation member, and the autonomous travel control part, in the allowance operation member-requiring route, determines whether or not the autonomous travel allowance operation member is being operated, and allows and executes the autonomous travel while operating the autonomous travel allowance operation member, and does not allow nor execute the autonomous travel while the autonomous travel allowance operation member is not operated.

* * * * *